United States Patent [19]
Zannini
[11] Patent Number: 5,050,282
[45] Date of Patent: Sep. 24, 1991

[54] O-RING INSERTION TOOL

[75] Inventor: Frank Zannini, Waterford, Conn.
[73] Assignee: The United States of America as represented by the Secretary of the Navy, Washington, D.C.

[21] Appl. No.: 573,925
[22] Filed: Aug. 27, 1990
[51] Int. Cl.[5] .......... B23P 19/02
[52] U.S. Cl. .......... 29/235
[58] Field of Search .......... 29/262, 263, 274, 280, 29/282, 229, 235; 269/48.1; 81/443, 444

[56] References Cited

U.S. PATENT DOCUMENTS

| | | | |
|---|---|---|---|
| 1,621,733 | 3/1927 | McCord | 29/280 |
| 3,030,700 | 4/1962 | Jensen | 29/235 |
| 3,535,765 | 10/1970 | Denehie | 29/263 |
| 4,916,792 | 4/1990 | Haubus | 29/263 |

*Primary Examiner*—Robert C. Watson
*Attorney, Agent, or Firm*—Michael J. McGowan; Prithvi C. Lall; Michael F. Oglo

[57] ABSTRACT

A tool for installing an O-ring in an inwardly facing O-ring groove in an electrical connection includes a guide shaft and a contact member slidably and rotatably received in the guide shaft. The guide shaft includes an elongated cylindrical shaft portion and a flared end portion on the shaft portion. The contact member includes an attachment portion for slidably and rotatably securing the contact member on the shaft portion and a contact finger on the attachment portion which extends in a direction toward the flared end portion of the guide shaft. The tool is operable by assembling an O-ring on the shaft portion between the flared end portion and the contact finger, inserting the flared end portion into a connection and then manipulating the contact member to advance the O-ring into an O-ring groove in the connector with the contact finger.

10 Claims, 1 Drawing Sheet

O-RING INSERTION TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The instant invention relates to electrical connectors and more particularly to a tool for accurately and effectively installing an O-ring in an inwardly facing O-ring groove in an electrical connector without causing damage to the O-ring.

(2) Description of the Prior Art

While it has generally been found the electrical connectors of a general type which are adapted for receiving O-rings in inwardly facing O-ring grooves therein can be effectively utilized for achieving electrical connections which are impervious to water it has been found that it can often be difficult to properly and effectively install O-rings into the inwardly facing O-ring grooves of connectors of this type. In this connection, heretofore O-rings have generally been installed in the O-ring grooves of connectors, such as D. G. O'Brien 110 Series Receptacle Connectors manufactured by D. G. O'Brien, Inc. of Seabrook, NH, utilizing various probes, such as screw drivers and the like. It has often been found that the use of tools of this type can cause O-rings to be improperly installed in O-ring grooves and/or to become damaged during installation procedures. Further, it has been found the electrical connections made with receptacle connectors of this type have often failed as a result of water penetration caused by improperly installed or damaged O-rings. Since connectors of this type have often been used in highly critical applications, such as in submarine antenna systems, connector failures have often had extremely serious consequences. Specifically, they have interfered with the ability of patrolling submarines to maintain radio communications.

SUMMARY OF THE INVENTION

Accordingly, it is a primary object of the instant invention to provide an effective tool for installing an O-ring in an inwardly facing O-ring groove of an electrical connector.

Another object of the instant invention is to provide a tool for installing an O-ring into a D. G. O'Brien 110 Series Connector.

An even still further object of the instant invention is to provide a tool for installing an O-ring in an inwardly facing O-ring groove in a waterproof electrical connector in a manner which permits the O-ring to be properly installed without causing damage to the O-ring.

Other objects, features and advantages of the invention shall become apparent as the description thereof proceeds when considered in connection with the accompanying illustrative drawings.

The instant invention provides an effective solution to the problem of providing a means for installing an O-ring in the inwardly facing O-ring groove of a connector, such as a D. G. O'Brien 110 Series Connector, without causing damage to the O-ring. In this regard, the tool of the instant invention is operative for installing an O-ring in a female socket connector of a type having an open end, an inwardly facing O-ring groove and an inwardly facing main inner surface between the O-ring groove and the open end. Specifically, the tool of the instant invention is operative for installing an O-ring having an outer diameter which is substantially equal to the diameter of an O-ring groove of a female socket connector and an inner diameter which is slightly less than the diameter of the adjacent inner surface in the connector. The tool of the subject invention comprises an elongated guide shaft including a cylindrical main shaft portion having a diameter which is less than the diameter of the main inner surface of the connector by an amount equal to at least twice the sectional dimension or thickness of the O-ring. The guide shaft further includes a flared portion on an end of the shaft portion, the flared portion having a flared outer surface and having a point of maximum diameter where the diameter of the flared portion is just slightly less than the diameter of the main inner surface of the connector. The flared portion preferably flares outwardly from the main portion to the point of maximum diameter of the flared portion at an angle of approximately 20° over a distance which is at least equal to the thickness of the O-ring. The guide shaft is adapted to be received in an operative position in a socket connector so that the point of maximum diameter of the flared portion is located adjacent the inner side edge of the O-ring groove therein and so that the flared surface is spaced from the main inner surface of the connector by a distance at least equal to the sectional dimension of the O-ring. The tool further includes a contact member including a tubular portion which is rotatably and slidably received on the guide shaft and a contact finger extending from the tubular portion toward the flared portion. The tool is operative by assembling an O-ring on the guide shaft so that it is positioned adjacent the flared portion thereof and then inserting the guide shaft in a socket connector so that the point of maximum diameter of the flared portion is located adjacent the inner side edge of the O-ring groove in the connector. The contact member can then be advanced toward the connector so that the contact finger urges a portion of the O-ring into the inwardly facing O-ring groove in the connector. By then withdrawing the contact finger from the connector and rotating the contact member slightly an additional portion of the O-ring can be advanced into the O-ring groove in this manner. This procedure can then be followed until the entire O-ring is fully installed in the O-ring groove of the connector.

In a preferred form of the tool of the instant invention the guide shaft further includes a terminal portion which extends from the flared portion terminating in a terminal end. In this embodiment the terminal portion has a recess formed in the terminal end thereof which is dimensioned for receiving a terminal of an electrical connector in order to further position the tool of the subject invention for installing an O-ring in an O-ring groove. The tubular portion of the contact member is preferably formed in a substantially cylindrical configuration and it preferably has an outer diameter which is slightly less than the diameter of the inner surface of the connector and an inner diameter which is slightly greater than the diameter of the main portion of the guide shaft. As a result, the contact member is preferably loosely received on the guide shaft so that the contact finger can be tilted slightly to align it with an O-ring. Further, the contact finger which extends from the tubular portion is preferably formed as a continuous extension of an arcuate segment which is less than approximately half of the tubular portion. The contact finger preferably terminates in a blunt end and the terminal end portion of the inner surface of the contact member preferably angles outwardly at an angle of approximately 21° so that the contact member can be advanced a short distance along the flared end portion of the guide shaft. In addition, the tool preferably further comprises means retaining the contact member on the guide shaft.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
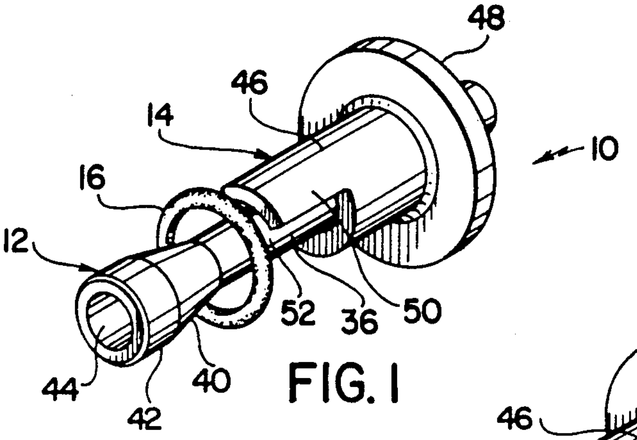
FIG. 1 is a perspective view of the tool of the instant invention in combination with an O-ring.
Figure 2:
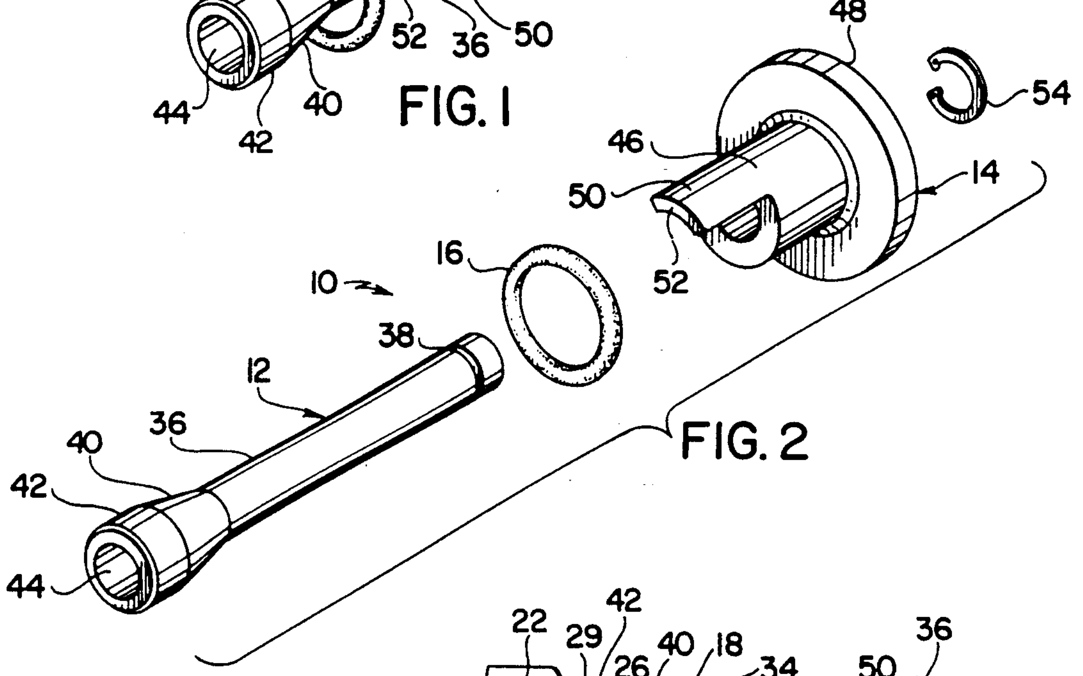
FIG. 2 is an exploded perspective view thereof.

Referring now to the drawing, the tool of the instant invention is illustrated and generally indicated at 10 in FIGS. 1–4. The tool 10 comprises a guide shaft generally indicated at 12 and a contact member generally indicated at 14, and it is operative for installing an O-ring 16 in a connector generally indicated at 18 in a manner illustrated in FIGS. 3 and 4.

The connector 18 preferably comprises a conventional connector, such as a 110 Series Connector made by D. G. O'Brien, Inc. of Seabrook, NH, although it will be understood that the tool 10 can also be adapted for installing O-rings in other similar types of connectors.

Figure 3:
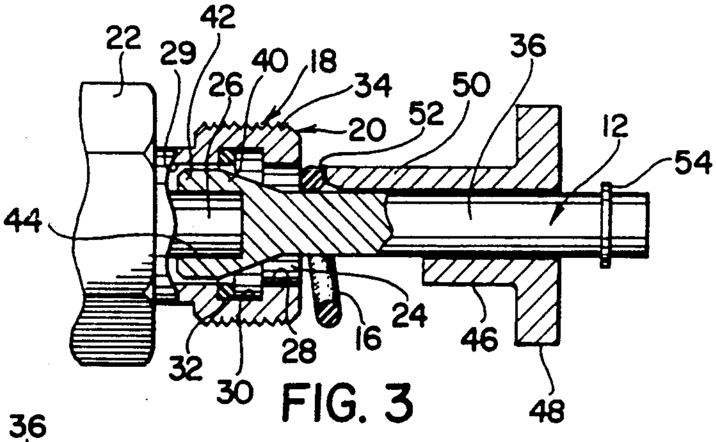
FIGS. 3 and 4 are sequential views illustrating the use of the tool for installing an O-ring in a connector.
Figure 4:
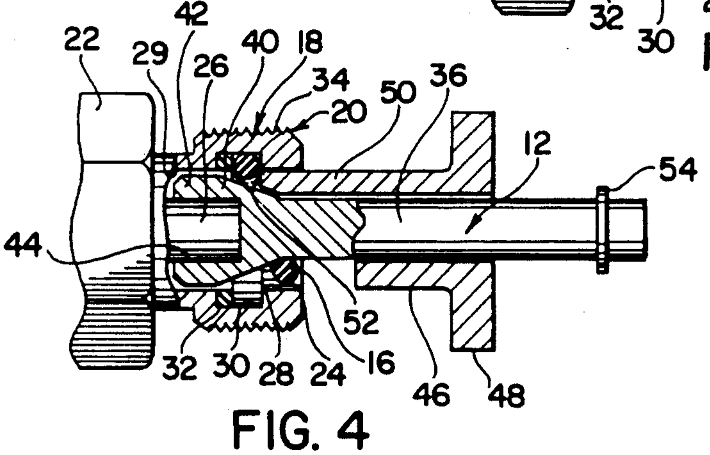

Referring first to FIGS. 3 and 4, the connector 18 comprises a housing or body including a socket portion generally indicated at 20 which extends integrally from a hexheaded base portion 22. The socket portion 20 has an interior cavity 24 formed therein and an electrical contact 26 which is electrically insulated from the base portion 22 projects axially into the cavity 24 in a direction toward the open end thereof. The interior of the cavity 24 is partially defined by an inwardly facing main inner surface 28 which extends from the open end of the cavity 24 to an O-ring groove 0 and an inner recess surface 29 extends inwardly beyond the O-ring groove 30. The O-ring groove 30 has a diameter which is slightly larger than that of the main inner surface 28 and it is dimensioned for receiving the O-ring 16 therein. Received in the O-ring groove 30 is a teflon backup ring 32 which defines the inner side edge of the effective area in the O-ring groove 30, which area is dimensioned for receiving the O-ring 16. The outer side of the socket portion 20 has threads 34 formed thereon for receiving and securing a mating connector in assembled relation with the connector 18.

The guide shaft 12 includes an elongated cylindrical main shaft portion 36 having a reduced annular groove 38 adjacent one end thereof, a flared portion 40 which extends from the opposite end of the shaft portion 36 and a terminal portion 42 on the end of the flared portion 40. The shaft portion 36 has a diameter which is less than the diameter of the main inner surface 28 of the coupling 18 by at least twice the sectional dimension or thickness of the O-ring 16. The flared portion 40 flares outwardly from the shaft portion 36 at an angle of approximately 20° to a maximum diameter which is slightly less than the diameter of the main inner surface 28. The longitudinal extent of the flared portion 40 is preferably at least equal to the effective width of the O-ring groove 30 (the width of the groove 30 minus the width of the backup ring 32). The terminal portion 42 is also of cylindrical configuration and a recess 44 extends axially inwardly from the terminal end of the terminal portion 42 for receiving the contact 26.

The contact member 14 comprises a tubular cylindrical portion 46, an outwardly extending annular flange 48 on the cylindrical portion 46 and a contact finger 50 which extends integrally from the tubular portion 46 in a direction away from the flange 48. The contact finger 50 is preferably formed as an integral arcuate extension of a sector of the tubular portion 46 and the outer surface of the contact finger 50 preferably represents an extension of the outer surface of the tubular portion 46. The finger 50 is formed as an arcuate extension of less than approximately one half of the tubular portion 46 and preferably approximately one fourth thereof and it has a blunt terminal end 52. Further, the terminal end portion of the inner surface of the contact member preferably angles outwardly as shown to allow the contact member to be advanced a short distance along the flared portion 40 of the guide shaft 12. The contact member 14 is loosely received on the guide shaft 12 so that the contact member 14 is rotatable and slidable along the length of the shaft 12 for advancing the contact finger 50 in a direction toward the flared portion 40, and so that the contact member can be tilted slightly on the shaft 12 for aligning the terminal end 52 with an O-ring. A snap ring 54 is received in the groove 38 for retaining the contact member 14 on the shaft 12.

The O-ring 16 is of conventional construction and it is dimensioned to be received in the effective area of the O-ring groove 30.

For use and operation of the tool 10 the O-ring 16 is assembled on the guide shaft 12 so that it is positioned in the manner illustrated in FIG. 1 between the terminal end 52 of the contact finger 50 and the flared portion 40. The guide shaft 12 is then assembled in the connector 18 so that the contact 26 is received in the opening 44. Once the guide shaft 12 has been assembled in the connector 18 in this manner the flared portion 40 is located adjacent the groove 30, although the flared portion 40 is spaced from the main inner surface 28 by a distance which is at least equal to the thickness or sectional dimension of the O-ring 16. Further, once the guide shaft 12 has been assembled in the socket portion 20 of the connector 18 the contact member 14 can be advanced along the guide shaft 12 toward the flared portion 40 by grasping the flange 48, tilting the contact member 14 slightly to align the terminal end 52 with the O-ring 16 and advancing the contact member 14 so that the terminal end 52 of the contact finger 50 engages the O-ring 16 to urge it into the O-ring groove 30 in the manner illustrated in FIGS. 3 and 4. After an initial portion of the O-ring 16 has been assembled in the O-ring groove 30 in this manner the contact member 14 can be retracted from the socket portion 20, rotated slightly on the shaft 12, and then again advanced into the socket portion 20 so that it contacts the O-ring 16 to advance a different portion of it into the groove 30. This procedure can then be repeated until the entire O-ring 16 has been assembled in the O-ring groove 30.

It is seen therefore that the instant invention provides an effective tool for installing an O-ring in an O-ring groove of a connector. The tool 10 can be effectively utilized for assembling an O-ring 16 in an O-ring groove 30 in a socket portion 20 of a connector so that the O-ring is accurately and positively assembled in the groove 30 without causing damage to the O-ring 16. As a result, the connector 18 can be more effectively and reliably utilized for effecting water tight connections in various applications, including underwater applications. Hence it is seen that the tool of the instant invention represents a significant advancement in the art which has particular merit in various critical applications.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A tool for installing an O-ring in a female socket connector, said socket connector having an open end, an inwardly facing inner O-ring groove and an inwardly facing main inner surface between said O-ring groove and said open end, said O-ring groove having a first side edge which is adjacent said main inner surface and an opposite second side edge which is spaced from said first side edge in a direction away from said open end, said main inner surface having a first diameter, said O-ring groove having a second diameter which is at least slightly greater than said first diameter, said O-ring having an outer diameter which is substantially equal to said second diameter, an inner diameter which is at least slightly less than said first diameter and a thickness defined by the distance between the inner and outer diameters thereof, said tool comprising an elongated guide shaft including a cylindrical main shaft portion having a diameter which is less than said first diameter by an amount equal to at least twice said thickness and a flared portion on an end of said shaft portion, said flared portion having a flared outer surface, said flared portion having a point of maximum diameter where the diameter of said flared portion is just slightly less than said first diameter, said flared portion flaring outwardly from said main portion to said point of maximum diameter over a distance which is at least equal to said thickness, said guide shaft being receivable in an operative position in said socket connector so that said point of maximum diameter is located adjacent said O-ring groove second edge and so that said flared surface is spaced from said main inner surface by a distance at least equal to said thickness, said tool further comprising a contact member including attachment means rotatably and slidably attaching said contact member on said guide shaft and a contact finger extending from said attachment means toward said flared portion, said contact finger being receivable in said socket connector when said guide shaft is in said operative position for urging said O-ring into said O-ring groove.

2. In the tool of claim 1, said socket connector further characterized as a series electrical receptacle connector and further including a closed inner end and an electrical contact extending a distance from said inner end toward said open end, said guide shaft further including a terminal portion extending from said flared portion, said terminal portion terminating in a terminal end having a recess formed therein which is dimensional for receiving said electrical contact therein, said tool being receivable in said socket connector so that said terminal end is in engagement with said inner end with said contact received in said recess and said point of maximum diameter adjacent said second edge.

3. In the tool of claim 1, said attachment means comprising a tubular portion including a substantial cylindrical outer surface having a diameter which is just slightly less than said first diameter, said contact finger having an outwardly facing surface which is a substantially continuous extension of an arcuate segment of said cylindrical outer surface.

4. In the tool of claim 3, said contact finger being an extension of an arcuate segment which is less than half of said tubular portion.

5. In the tool of claim 1, said finger being formed in a configuration of an arcuate segment of less than approximately half of a tubular cylinder and having an outer diameter which is slightly less than said first diameter and an inner diameter which is slightly greater than the diameter of said main shaft portion.

6. In the tool of claim 1, said finger terminating in a blunt end.

7. In the tool of claim 5, said finger terminating in a blunt end.

8. The tool of claim 1 further comprising means retaining said contact member on said guide shaft.

9. In the tool of claim 6, said contact finger having an inner surface, the portion of the inner surface of said contact finger which is adjacent said blunt end angling outwardly to permit said contact finger to be advanced a short distance along said flared portion.

10. In combination, a tool for installing an O-ring in a female socket connector and an O-ring, said socket connector having an open end, an inwardly facing inner O-ring groove and an inwardly facing main inner surface between said O-ring groove and said open end, said main inner surface having a first diameter, said O-ring groove having a second diameter which is at least slightly greater than said first diameter, said O-ring having an outer diameter which is substantially equal to said second diameter, an inner diameter which is at least slightly less than said first diameter and a thickness defined by the distance between the inner and outer diameters thereof, said tool comprising an elongated guide shaft including a cylindrical main shaft portion having a diameter which is less than said first diameter by an amount equal to at least twice said thickness and a flared portion on an end of said shaft portion, said flared portion having a flared outer surface, said flared portion having a point of maximum diameter where the diameter of said flared portion is just slightly less than said first diameter, said guide shaft being receivable in an operative position in said socket connector so that said flared portion is positioned adjacent said O-ring groove and said flared surface is spaced from said main inner surface by a distance which is at least equal to said thickness, said tool further comprising a contact member including attachment means rotatably and slidably attaching said contact member to said guide shaft and a contact finger extending from said attachment means toward said flared portion, said O-ring being received on said guide shaft between said flared portion and said contact member, said contact member being engageable with said O-ring for urging said O-ring into said O-ring groove when said guide shaft is received in said operative position in said socket connector.

* * * * *